United States Patent [19]

Noguchi et al.

[11] 4,029,075

[45] June 14, 1977

[54] COMBUSTION APPARATUS FOR AN INTERNAL COMBUSTION ENGINE

[75] Inventors: Masaaki Noguchi, Nagoya; Yukiyasu Tanaka, Okazaki; Setsuro Sekiya; Katsuhiko Motosugi, both of Toyota, all of Japan

[73] Assignee: Toyota Jidosha Kogyo Kabushiki Kaisha, Toyota, Japan

[22] Filed: Nov. 6, 1975

[21] Appl. No.: 629,227

[30] Foreign Application Priority Data

Nov. 13, 1974 Japan .......................... 49-130009
Nov. 13, 1974 Japan .......................... 49-130010

[52] U.S. Cl. .................. 123/75 B; 123/32 ST; 123/32 SP; 123/32 AA; 123/191 SP; 169/PA
[51] Int. Cl.² .......................................... F02B 19/10
[58] Field of Search ............ 23/32 SP, 32 ST, 75 B, 23/191 S, 191 SP, 32 AA, 32 J, 169 PA

[56] References Cited

UNITED STATES PATENTS

| | | | |
|---|---|---|---|
| 3,382,850 | 5/1968 | Baudry | 123/32 ST |
| 3,776,212 | 12/1973 | Karlowitz | 123/32 ST |
| 3,890,940 | 6/1975 | List | 123/32 SP |
| 3,892,216 | 7/1975 | Danis | 123/32 SP |
| 3,921,607 | 11/1975 | Kawamoto | 123/32 ST |
| 3,926,158 | 12/1975 | Dolza | 123/32 ST |

*Primary Examiner*—Ronald H. Lazarus
*Attorney, Agent, or Firm*—Finnegan, Henderson, Farabow & Garrett

[57] ABSTRACT

An auxiliary combustion chamber at least partially embedded in the cylinder head of an internal combustion engine adjacent the intake valve of a main combustion chamber and having a spark plug positioned in the auxiliary chamber and unvalved inlet and outlet ports interconnecting the auxiliary chamber with the main chamber. The air/fuel mixture drawn into the main combustion chamber is deflected by the back surface of the intake valve into the inlet port of the auxiliary combustion chamber toward the spark plug. The auxiliary combustion chamber may include a shell positioned in a cavity in the cylinder head with devices for properly positioning the shell in the cavity and for retaining the shell and preventing it from rotating. A passage is provided for rich air/fuel mixture terminating at the rear surface of the valve, when closed, with refinements of the passage, shape of the inlet port, and main combustion chamber wall facilitating the flow of the rich mixture into the auxiliary combustion chamber by venturi action. The flow of fresh mixture into the auxiliary combustion chamber through suction scavenges the combustion gas remaining from the prior firing sequence.

12 Claims, 21 Drawing Figures

Fig. 18
SEC. A-A

COMBUSTION APPARATUS FOR AN INTERNAL COMBUSTION ENGINE

FIELD OF THE INVENTION

This invention pertains to auxiliary combustion chambers for internal combustion engines and more particularly to unvalved auxiliary combustion chambers at least partially embedded in the cylinder head.

BACKGROUND OF THE INVENTION

Various means for removing toxic substances contained in the exhaust gases of internal combustion engines have been proposed. Among them is included apparatus that burns a lean air/fuel mixture. This is one of the very effective measures, achieved by taking notice of the fact that combustion of a lean air/fuel mixture, in which the ratio of air to fuel is high, reduces such toxic substances, especially nitrogen oxides, in the exhaust gases.

However, a lean air/fuel mixture usually gives rise to misfiring and lowers thermal efficiency of the engine cycle, because of the low ignitability and slow flame-propagation speed. To overcome this shortcoming, it has been proposed to provide an auxiliary combustion chamber in addition to the main combustion chamber, so that a lean air/fuel mixture in the main combustion chamber is ignited by the torch flame blown from the auxiliary combustion chamber. In a typical embodiment of this type, the auxiliary combustion chamber is equipped with an intake valve to admit a relatively rich air/fuel mixture, which is ignited by a spark plug, and then a lean air/fuel mixture in the main combustion chamber is burnt by the torch flame from the auxiliary combustion chamber. This type of arrangement is very effective but the construction of the auxiliary chamber is very complex because of the necessity of an auxiliary intake valve.

It has also been proposed that an auxiliary combustion chamber havng no intake valve be positioned in the main combustion chamber. During the compression stroke, lean air/fuel mixture in the main combustion chamber is forced into the auxiliary combustion chamber, where it is ignited by a spark plug. Then, the flame produced is blown back into the main combustion chamber to burn the lean air/fuel mixture therein. This arrangement has the defects that the residual gases from the preceding strike remain in the auxiliary combustion chamber making the ignition on next strike difficult and the lean air/fuel mixture is, itself, difficult to fire.

In the internal combustion engine having an auxiliary combustion chamber of this type, additionally the temperature in the auxiliary combustion chamber becomes excessively high because the auxiliary combustion chamber is not only exposed to high temperature gases for a long time, since ignition and combustion starts therefrom, but also is subjected to the influence of heat radiated through the flame nozzle provided therein. As a consequence, such undesirable phenomena become liable to occur as premature ignition and a reduction in the durability of the auxiliary combustion chamber against high temperature. It is, therefore, necessary to provide the auxiliary combustion chamber with the capacity to withstand high temperature and to dissipate the heat accumulated therein.

SUMMARY OF THE INVENTION

It is therefore, the primary object of this invention to improve auxiliary combustion chambers for internal combustion engines.

It is another object of this invention to supply an auxiliary combustion chamber with an enriched air/fuel mixture without a complex valve construction.

It is a further object of this invention to scavenge from an unvalved auxiliary combustion chamber the combustion gases from one firing sequence before the succeeding firing sequence.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the combustion apparatus of the invention for an internal combustion engine utilizing a combustion chamber and a spark plug fitted into a cylinder head for firing an air/fuel mixture compressed in the combustion chamber comprises a cavity in the cylinder head and an auxiliary combustion chamber shell fitted in said cavity, the shell including a threaded aperture and the spark plug being threaded into the aperture for retaining the shell in the cavity.

Preferably the combustion apparatus of the invention also includes means for preventing the shell from rotating in the cavity.

Also preferably the rotation preventing means include a recess in the outer surface of the shell and a pin threaded through the cylinder head, the inner end of the pin engaging the recess.

It is also preferred that the base and wall portions of the shell be formed as a right circular cylinder, that the spark plug be axially aligned in the base of the cylinder and that the recess be located in the curved surface of the cylinder.

It is also preferred that the means for preventing the shell from rotating in the cavity also serves as the means for properly positioning the shell in the cavity.

In an alternative embodiment of the invention, the cylindrical portion of the shell includes an axially threaded aperture in the base and a threaded aperture in the curved cylindrical wall with an aligned aperture in the cylinder head, the axial aperture for receiving a bolt and the cylindrical wall aperture for receiving the spark plug.

Preferably, the threaded aperture in the curved cylindrical wall of the auxiliary combustion chamber shell and its aligned aperture in the cylinder head are angled away from the base of the shell.

Apparatus of the invention for assembling the auxiliary combustion chamber shell in the cavity in the cylinder head includes an aligning tool, threaded on its inner end for properly aligning the threaded aperture in the curved cylindrical wall of the shell with its respective aperture in the cylinder head.

The accompanying drawings, which are incorporated in and constitute a part of this specification, illustrate embodiments of the invention and, together with the description, serve to explain the principles of the invention.

DESCRIPTION OF THE PREFERRED EMBODIMENT

Reference will now be made in detail to the present preferred embodiment of the invention, an example of which is illustrated in the accompanying drawings.

Figure 1:
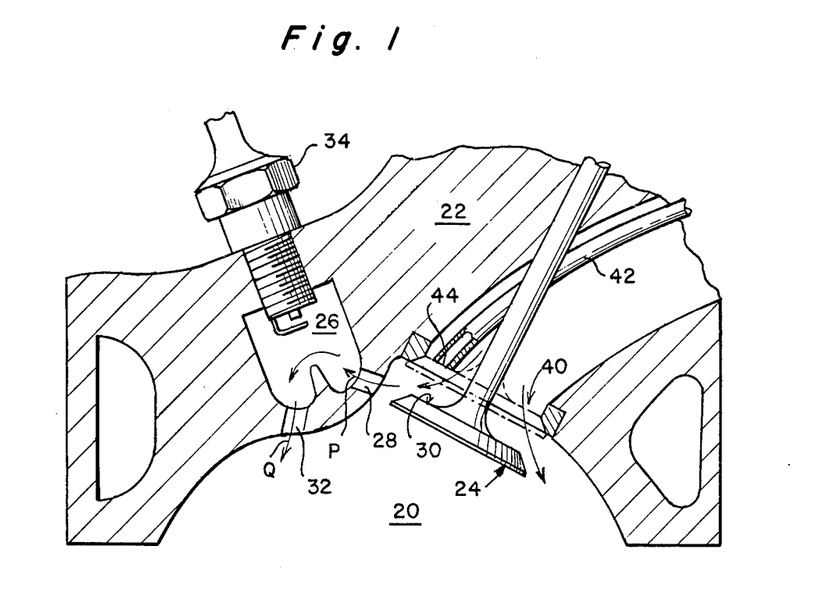
FIG. 1 is a cross-sectional view of an auxiliary combustion chamber according to this invention, which is integrally cast inside the cylinder head.
Figure 2:
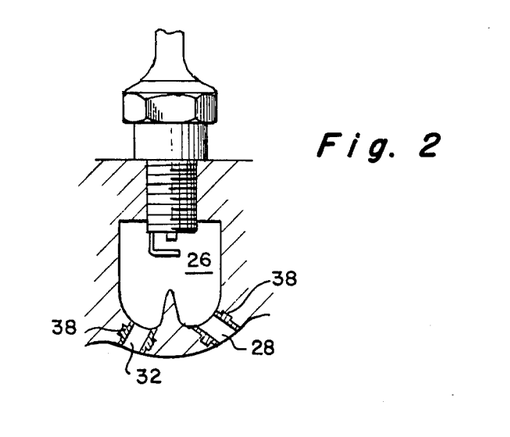
FIG. 2 is a portion of the auxiliary combustion chamber of FIG. 1 including heat and corrosion resisting inserts in the unvalved inlet and outlet ports.

Referring now to FIGS. 1 and 2, a main combustion chamber 20 is shown in a cylinder head 22 together with an intake valve 24 for admitting a mixture of air and fuel into the combustion chamber.

In accordance with the invention, an auxiliary combustion chamber 26, having no intake valve, is integrally cast within the cylinder head 22. An inlet port 28 opens toward a stream of air/fuel mixture P admitted by the intake valve 24 and deflected toward the inlet port 28 by the back surface 30 of the valve. The inlet port 28 and an outlet port 32 interconnect the auxiliary chamber 26 with the main chamber 20. A spark plug 34 has its spark gap 36 positioned in the auxiliary combustion chamber 26.

Preferably, in the casting of the cylinder head, the portion of the wall of the main combustion chamber including the inlet and outlet ports is formed to extend slightly outwardly into the main combustion chamber. The inlet port 28 is then preferably angled toward the intake of air/fuel mixture of the main combustion chamber for facilitating the flow of incoming mixture into the port 28.

On being deflected by the back surface 30 of the valve 24, part of the incoming mixture becomes the stream P that is introduced into the auxiliary combustion chamber 26 through the inlet port 28. This stream of incoming mixture P may be mixed with rich air/fuel mixture supplied from a pipe 42. As the air/fuel mixture is drawn into the auxiliary combustion chamber on the intake stroke of the piston, the residual combustion gas of the preceding firing stroke is scavenged, i.e., swept out, through the outlet port 32, as indicated by the arrow Q. Then, on the compression stroke, the intake valve 24 closes the intake supply 40 including the rich air/fuel mixture supply pipe 42, thereby stopping the supply of the rich air/fuel mixture to the main combustion chamber 20, and further, preventing said mixture from stagnating in the incoming mixture passage. At the conclusion of the compression stroke, a portion of the lean air/fuel mixture in the main combustion chamber 20 is forced into the auxiliary combustion chamber 26 where it is intermingled with the rich mixture compressed and ignited by the spark plug 34. Then, the torch flame blown through the ports 28 and 32 ignites the lean air/fuel mixture in the main combustion chamber 20.

When the cylinder head 22 is made of such light alloy as aluminum that is low in heat and corrosion resistivity at high temperature, tube inserts 38, made of such heat and corrosion resisting material as stainless steel or ceramics, may be fixed inside the ports 28, 32, connecting the auxiliary and main combustion chambers 26 and 20, as shown in FIG. 2. Since heat load becomes highest in the inlet port 28 and outlet port 32, erosion due to excessive heat and damages due to high temperature corrosion are most likely to occur in these areas and are minimized by inserts 38.

The invention, embodied as described above, can achieve the following remarkable effects. Because the auxiliary combustion chamber is integrally cast within the cylinder head, transmission of heat therefrom can be attained smoothly, thereby improving the effect of its heat radiation. Further, it is unnecessary to use any costly heat resisting alloy for the auxiliary combustion chamber. When the cylinder head is made of such light alloy as aluminum alloy that is more readily affected by heat, heat resisting material need be used only in the inlet and outlet ports, where heat load becomes maximum, with a view to reducing the manufacturing cost.

On the induction stroke of the engine the intake valve 24 opens, and lean air/fuel mixture is drawn by suction into the main combustion chamber 20 through the incoming mixture passage 40. In accordance with the invention, a rich air/fuel mixture is supplied as part of the stream of incoming mixture, by use of a rich air/fuel mixture supply pipe 42. As embodied herein, the end of said pipe 42 is designed to be closed by the back surface of the valve 24 so that the rich air/fuel mixture cannot flow when the intake valve 24 is closed.

Figure 3:
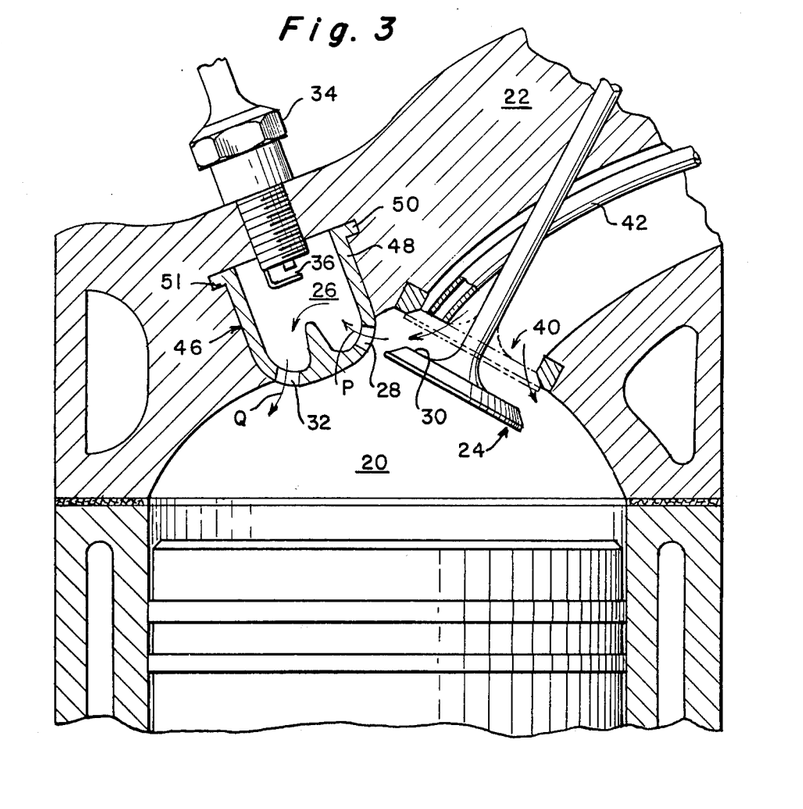
FIG. 3 is a cross-sectional view of a combustion chamber representing an embodiment of this invention, including an auxiliary combustion chamber shell in a cavity in the cylinder head.
Figure 4:
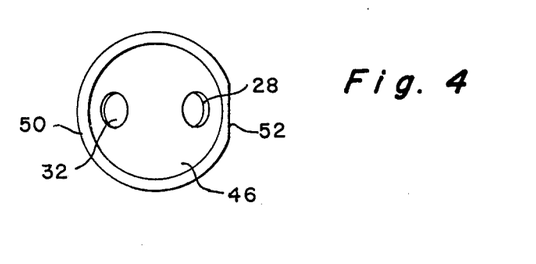
FIG. 4 is a bottom view of the auxiliary combustion chamber shell shown in FIG. 3.

In accordance with the invention, as shown in FIGS. 3 and 4, the auxiliary combustion chamber of the invention may be attained by inserting an auxiliary combustion chamber shell 46 in a cavity 48 formed in the cylinder head 22. As embodied herein, the auxiliary combustion chamber shell 46 is formed with a flange 50 cooperating with a channel 51 in the cylinder head to retain the shell in the cavity. A flattened area 52 is formed on the flange 50 for cooperating with complementary abutment in the channel 51 for positioning the shell 46 and preventing the shell from rotating. The shell 46 may be integrally fitted in the cylinder head 22 by inserting the shell into the mold when casting the cylinder head.

Means for preventing the auxiliary combustion chamber shell 6 from rotation or coming out of the cylinder head are not limited to ones shown in FIG. 4, but may include a roughened surface, a groove, or any other suitable means.

Preferably, the cavity 48 is formed as a right circular cylinder and positioned eccentrically in the cylinder head with respect to the axis of the cylinder for aligning the inlet port 28 more efficiently with the intake 40 of the main combustion chamber.

The auxiliary combustion chamber shell of the invention increases the efficiency with which the heat generated in the auxiliary combustion chamber is transmitted thereby increasing the durability of the auxiliary combustion chamber shell. Also, it is unnecessary to use any costly, heat-resisting alloy for the auxiliary combustion chamber shell of this type.

The use of the auxiliary combustion chamber shell is suited particularly for gasoline engines in which the temperature becomes high, but is also suited for diesel engines. Being inserted when casting the cylinder head, the auxiliary combustion chamber of this invention has higher heat transmission efficiency, as compared with others fitted in the cylinder head by press fitting or other methods. This facilitates the cooling of the auxiliary combustion chamber shell, which in turn reduces the influence of heat load. Therefore, even an auxiliary combustion chamber shell made of low-cost metal can insure sufficient durability.

Figure 5:
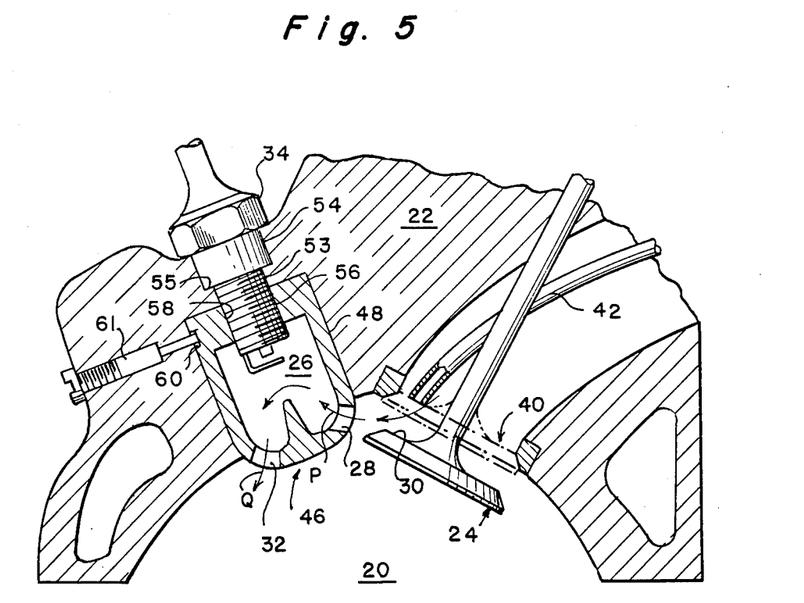
FIG. 5 is a cross-sectional view of another embodiment of this invention including apparatus for positioning an auxiliary combustion shell in a cavity in the cylinder head.

In accordance with the invention, as shown in FIG. 5, the auxiliary combustion shell 46 may be retained in the cavity 48 of the cylinder head 22 by the threaded portion of the spark plug 34 and may be prevented from rotating by a pin threaded into the cylinder head and engaging a notch in the outside surface of the shell.

As embodied herein, the cavity 48 may be formed substantially as a right circular cylinder and be interconnected to the outside of the cylinder head by a cylindrical aperture 53 having an enlarged outward portion 54 forming a shoulder 55 for receipt of a standard spark plug. The auxiliary combustion chamber shell 46 may be complementary in shape to the cylindrical cavity 48 and has a threaded aperture 56 for receiving the threaded portion 58 of the spark plug 34 axially aligned in the cylindrical cavity.

It is, of course, essential that the inlet port 28 to the auxiliary combustion chamber 26 be properly aligned with the air/fuel mixture being deflected by the back surface 30 of the valve 24. The shell 46 must therefore be properly positioned in the cavity 48 and must be maintained securely in the proper position.

As embodied herein, the cylindrical outside surface of the shell 46 may be provided with a slot or notch 60 which identifies the proper position of the shell 46. In addition, the notch 60 may permanently receive the end of a pin 61 threaded through the cylinder head for preventing any shifting in position of the shell 46.

Figure 6:
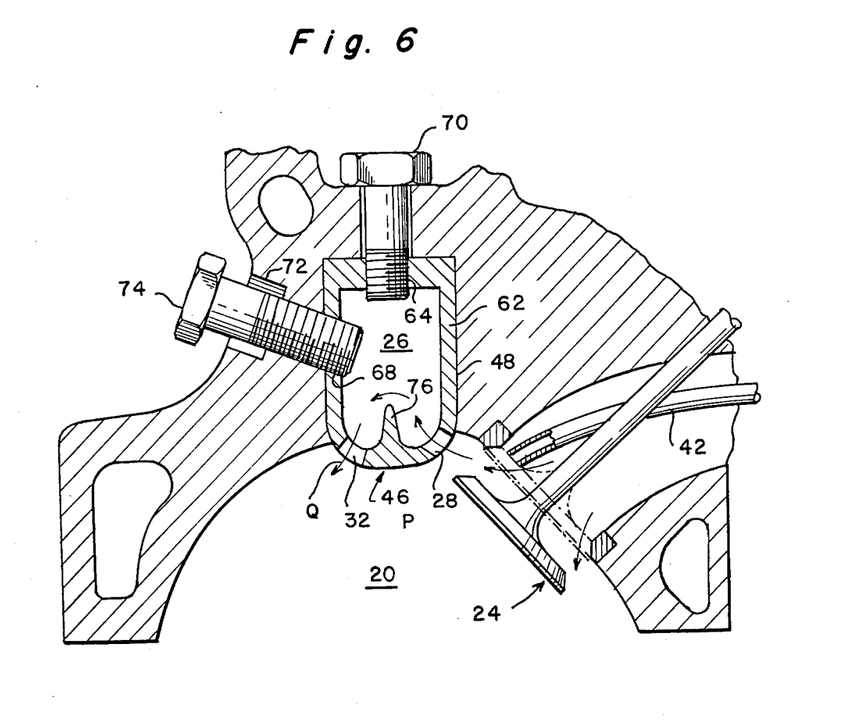
FIG. 6 is a cross-sectional view of still another embodiment of this invention showing devices for correctly positioning and retaining an auxiliary combustion shell in a cylinder head.
Figure 7:
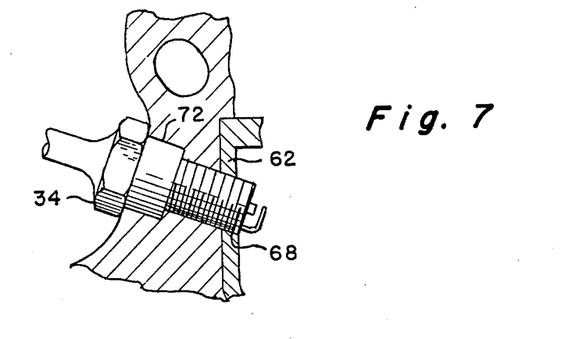
FIG. 7 is a cross-sectional view of the embodiment of FIG. 6 wherein the positioning device has been replaced by the spark plug.

Alternatively, as embodied herein and depicted in FIGS. 6 and 7, the cylindrical base 62 of the auxiliary combustion chamber shell 46 may be provided with two threaded apertures — one 64 axially through the base 66 of the cylindrical shell and another 68 through the curved surface of the shell.

The aperture 68 through the curved surface of the shell 46 is both for the purpose of properly positioning the shell 46 and for the receipt of the spark plug 34. The aperture 64 is utilized to receive a retaining bolt 70 through the cylinder wall 22 after the shell 46 is properly positioned.

Preferably the aperture 68 and its aligned bore 72 through the wall of the cylinder head 22 are angled toward the inlet port 28 of the auxiliary combustion chamber 26. An auxiliary positioning device such as bolt 74 may be utilized for precisely locating the shell 46 in the cavity 48 and then removed for insertion of the spark plug 34.

Alternatively, the spark plug 34 itself may be used for the additional two purposes of properly locating the shell 46 in the cavity 48 and for retaining the shell against rotation in the cavity.

By locating the spark plug in the side of the shell 46 and angling its direction toward the inlet port 28, the efficiency of the auxiliary combustion chamber 26 is increased. The direction of the focus of the rich air/fuel mixture deflected into the auxiliary combustion chamber 26 may be further guided and the scavenging effect of the air/fuel flow increased by the formation of a projection 76 on the internal surface of the shell 46 between the inlet port 28 and the outlet port 32. Such a projection 76 serves not only to direct the flow of the incoming air/fuel mixture but to reduce the turbulence in the shell 26 with improved flow of exhausted gases outwardly through the port 32.

Figure 8:
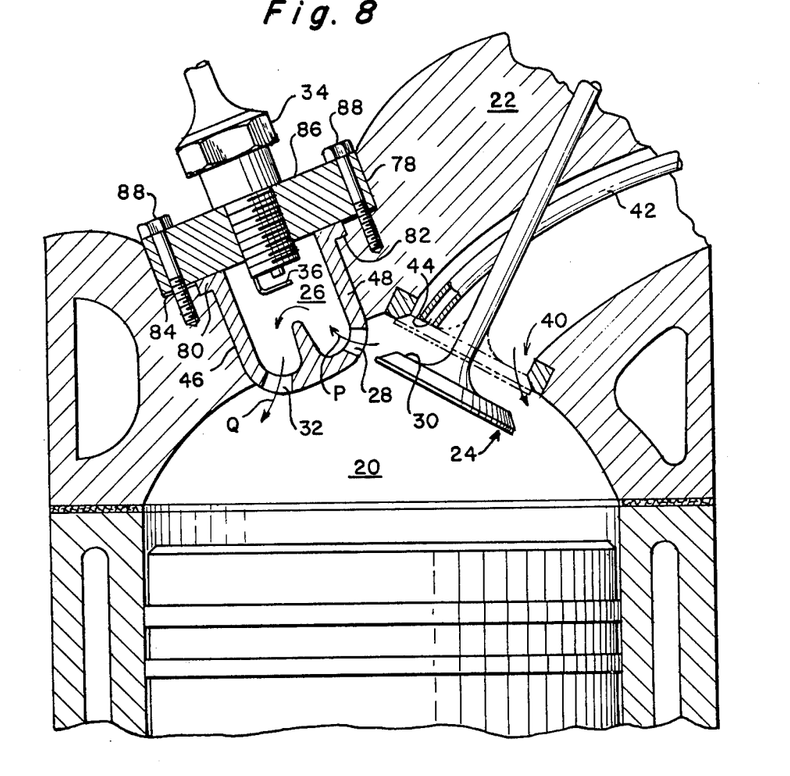
FIG. 8 is a cross-sectional view of a further embodiment of this invention.

In accordance with the invention, as shown in FIG. 8, the auxiliary combustion chamber shell 46 may be inserted into the cavity 48 in the cylinder head 22 through a bore 78, of larger diameter than the cylindrical cavity 48, extending through the wall of the cylinder head.

As herein embodied, the shell 46 has a flange 80 fitting into an annular notch 82 formed in the shoulder 84 between the periphery of the cavity 48 and the surface of the bore 78. A portion of the flange 80 may be flattened or cut away, as shown at 52 in FIG. 4, to form a positioning device when interacting with a complementary surface (not shown) formed in the annular notch 82.

As herein embodied, a cylindrical block 86 is inserted in the bore 78 flush against the flange 80 for retaining the shell 46 in proper position with the inlet port 28 and outlet port 32 extending into the main combustion chamber 20 and the inlet port 28 aligned to receive the stream P of air/fuel mixture. The block 86 may be secured in the bore 78 as by bolts 88 threaded into the cylinder head 22.

The spark plug 34 is axially threaded into the block 86 to have its spark gap 36 in the auxiliary combustion chamber 26.

Figure 9:
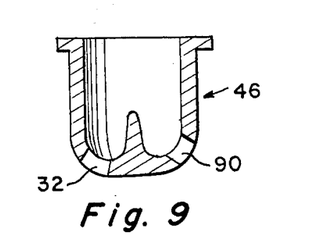
FIG. 9 is a cross-sectional view of the auxiliary combustion chamber shell of FIG. 8.
Figure 10:
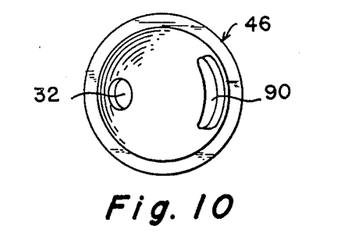
FIG. 10 is a bottom view of one embodiment for the shape for an inlet port of the shell of FIG. 8.

In accordance with the invention, it is advantageous to design the shape of the inlet port 28 so that the stream of air/fuel mixture P may be introduced efficiently. The stream of air/fuel mixture P, deflected by the back 30 of the valve 24, flows from the periphery of the intake 40 along the internal wall of the main combustion chamber 20. The rich air/fuel mixture supplied from the pipe 42 also tends to spread along the periphery of the intake 40. In the embodiment as shown in FIGS. 9 and 10, the shape of the inlet port 28 has been widened along the periphery of the air/fuel mixture intake 40. The elliptical space 90 of the inlet port 28 introduces the stream of air/fuel mixture P more efficiently than a perfectly circular shape. This combination of elements remarkably improves the operational stability and reliability of internal combustion engines utilizing an auxiliary combustion chamber having no intake valve. It is also desirable to form the inlet port 28 in such a shape as to produce as little abrasion resistance in the inlet as possible.

Figure 11:
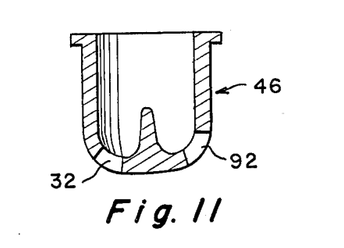
FIG. 11 is a cross-sectional view of the auxiliary combustion chamber shell of FIG. 8.
Figure 12:
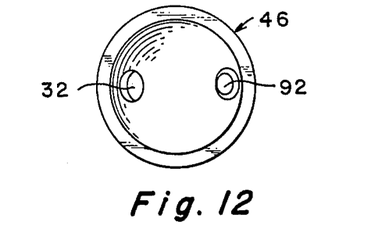
FIG. 12 is a bottom view of a second embodiment for the shape of an inlet port for the shell of FIG. 8.

In the embodiment shown in FIGS. 11 and 12, the shape of the inlet port 28 is formed as a trumpet 92, with its cross-sectional area progressively decreasing along the passage of the incoming air/fuel mixture running from the main combustion chamber side to the auxiliary combustion chamber side.

In this embodiment, resistance to the incoming air/fuel mixture is decreased and the scavenging efficiency of the auxiliary combustion chamber is improved, compared with other combustion chambers where the incoming mixture passage is uniform in cross-sectional area throughout its entire length.

In accordance with the invention, the efficiency of the auxiliary combustion chamber 46 may be further improved by recessing the intake 40 from the interior wall surface of the main combustion chamber 20 to promote better communication of the incoming air/fuel mixture between the intake 40 and the inlet port 28. Additionally, when the wall of the main combustion chamber is recessed slightly at the intake 40, the auxiliary combustion chamber shell 46 may be projected less into the main combustion chamber, thereby increasing the durability of the auxiliary combustion chamber through the lowering of its thermal load, and enabling the use of lower cost material for the auxiliary combustion chamber shell.

Figure 13:
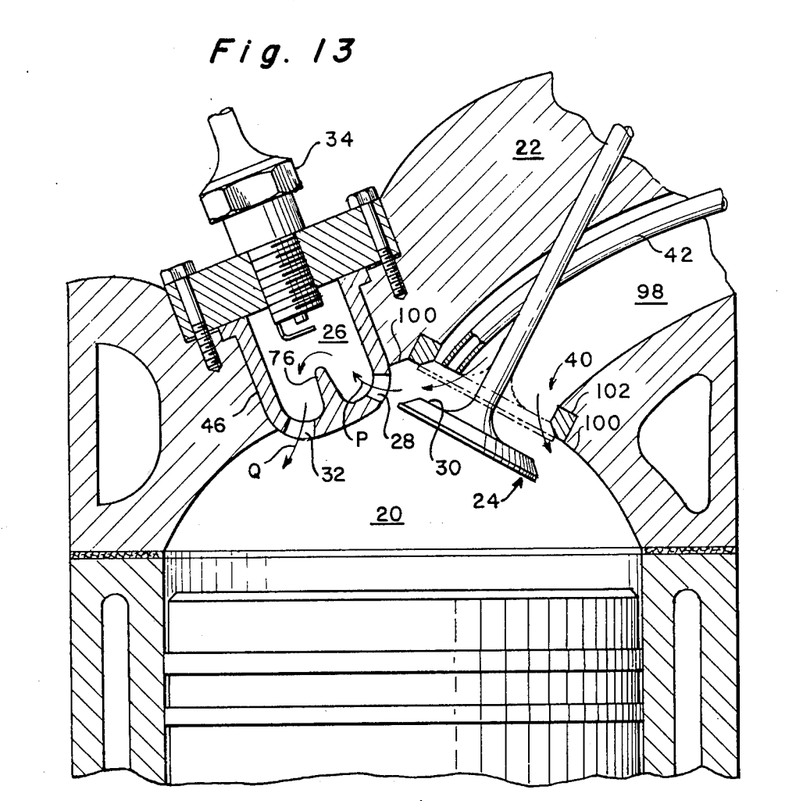
FIG. 13 is a cross-sectional view of still another embodiment of this invention.
Figure 14:
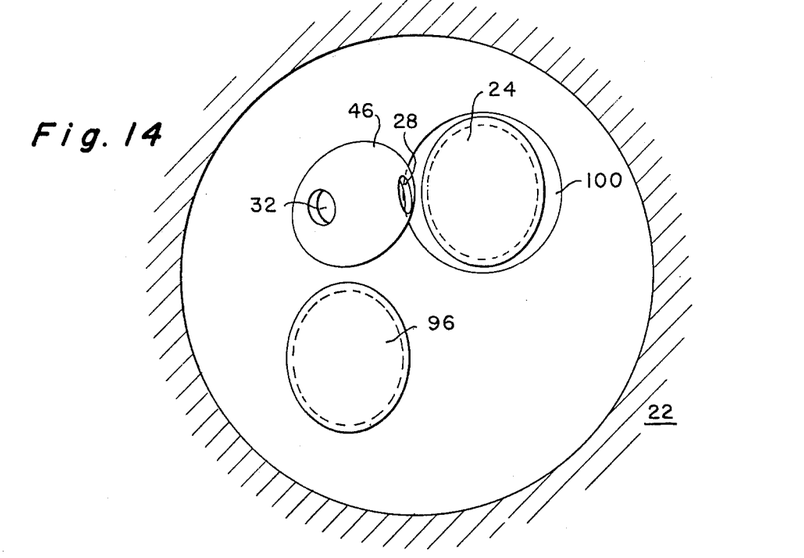
FIG. 14 is a schematic bottom view of the embodiment of FIG. 13 including the exhaust valve taken along lines A—A of FIG. 13.

As embodied in FIGS. 13 and 14, the main combustion chamber 20 is defined by a piston 94 and the cylinder head 22. The air/fuel mixture is introduced into the combustion chambers through the intake valve 24 and the combustion gas is discharged through an exhaust valve 96.

In accordance with the invention, the wall of the main combustion chamber 20 is recessed around the intake 40 of the passage 98 used to supply the lean air/fuel mixture into the combustion chamber. A recessed surface 100 is thus formed around the intake 40, thus permitting the valve seat 102 and the valve 24 to be slightly recessed into the wall of the main combustion chamber 20 for facilitating the flow of the deflected portion of the air/fuel mixture into the inlet port 28.

As previously described, a projection 76 is formed on the wall of the auxiliary combustion chamber shell 46 between the inlet port 28 and the outlet port 32 for increasing the scavenging effect of the gas flow. Although only two inlet and outlet ports are shown for the shell 46, it is understood that a larger number may be utilized if desired. The pipe 42, terminating at the opening 44, conducts a rich air/fuel mixture to the outlet 40 and is closed by the back surface 30 of the valve 24 when the valve is closed, as previously described. The rich air/fuel mixture is drawn into the main chamber 20 and the auxiliary chamber 26 by suction along with the lean air/fuel mixture through the intake 40 and is then deflected into the inlet port by the back surface 30 of the valve 24, as previously described.

The operation of this invention thus composed, as embodied in FIGS. 13 and 14, may be described as follows:

As the piston 94 enters its suction stroke, the intake valve 24 opens and a lean air/fuel mixture is introduced into the main combustion chamber 20 through the intake 40. A rich air/fuel mixture also is introduced into the main combustion chamber 20 through the passage 42. Being deflected by the back face 30 of the intake valve 24, part of the stream of incoming air/fuel mixture flows as indicated by the arrow P. The inlet port 28 made in the auxiliary combustion chamber shell 46 is aimed toward the deflected stream of incoming mixture, and the stream of incoming mixture is directed into the auxiliary combustion chamber 26. As a consequence, the residual combustion gas of the preceding stroke is scavenged through the outlet port 32 as indicated by the arrow Q. The projection 76 formed in the auxiliary combustion chamber shell 26 eliminates turbulence of the scavenging stream in the auxiliary combustion chamber 26, thereby preventing the fresh mixture introduced as the scavenging mixture from mixing with the residual combustion gas produced during the preceding stroke.

On entering the compression stroke, the intake valve 24 is received in the valve seat 102 to close the intake port opening 40. As the piston 94 elevates, the lean air/fuel mixture in the main combustion chamber is forced into the auxiliary combustion chamber 26, where it is mixed with the rich mixture, compressed and then ignited by the spark plug 34. The flame produced in the auxiliary combustion chamber 26 is then blown into the main combustion chamber 20, through the ports 28, 32 to ignite the lean air/fuel mixture therein.

In the above-described operation, communication between incoming stream mixture and the inlet port 28 can be insured, according to the invention, since the intake opening 40 is recessed from the ordinary surface of inner wall defining the main combustion chamber 20. Also, the auxiliary combustion chamber shell 46 of this embodiment is projected less into the main combustion chamber 20.

In the above-described embodiments, the intake passage 98 and the pipe 42 are provided to supply the lean and rich, air/fuel mixtures, respectively. The purpose of this is to achieve stable combustion even when the total air/fuel ratio in the cylinder becomes very high (for example, the air/fuel ratio of 22 to 24 to 1), by effectively supplying the right air/fuel mixture into the auxiliary combustion chamber through said pipe 42. However, the auxiliary chamber of the invention is operative without the addition of a rich mixture if only a lean mixture is desired.

As described previously, this invention ensures not only scavenging of the auxiliary combustion chamber but also ignition of the air/fuel mixture therein. By the use of the torch flame supplied from the auxiliary combustion chamber, the lean air/fuel mixture is burnt rapidly and completely, which results in a reduction in the nitrogen oxide content in the exhaust gases. By decreasing the thermal load imposed on the auxiliary combustion chamber shell, durability of the shell is increased. Also, this makes it possible to use low-cost material for the auxiliary combustion chamber shell.

In accordance with the invention, the ignition of the rich air/fuel mixture in the auxiliary combustion chamber is further improved by preheating the rich air/fuel mixture by passing it through a bore in the cylinder head. Additionally, the provision of a passage for the rich air/fuel mixture is simplified and the manufacture and assembly of the rich air/fuel mixture supplying apparatus facilitated.

Figure 15:
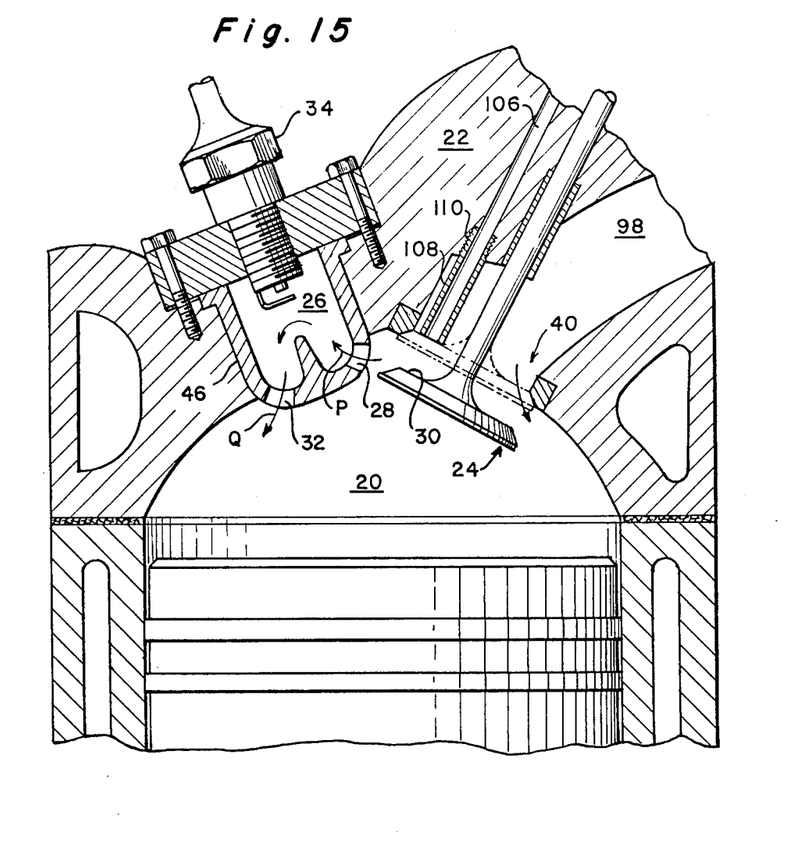
FIG. 15 is a cross-sectional view of the auxiliary combustion chamber and an embodiment of the enriched air/fuel input of the invention.

As embodied herein and shown in FIG. 15, a bore 106 is provided in the cylinder head 22 as a passageway for the rich air/fuel mixture to be utilized as part of the incoming stream P drawn into the auxiliary combustion chamber 26. A short tube 108 conducts the rich air/fuel mixture from the bore 106 into the intake opening 40. The mouth of the tube 108 is positioned adjacent the inlet port 28 of the shell 46 and is closed by the back surface 30 of the valve 24 when the valve is closed.

Figure 16:
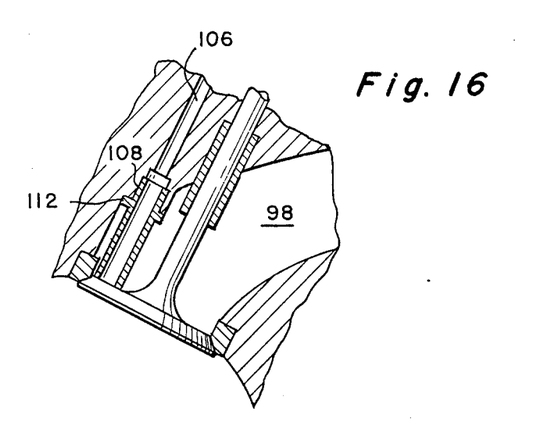
FIG. 16 is a partial view of a variation of the enriched air/fuel input of FIG. 15.

As embodied herein, the tube 108 may be affixed in the bore 106 by threads 110 as shown in FIG. 15, or may be press-fitted into the bore 106 against a flange 112 formed on the tube as shown in FIG. 16.

As embodied herein, the rich air/fuel mixture is heated in the bore 106 as it is drawn through this bore and the tube 108 by the sucking action of a negative pressure working at the end of the tube when the intake valve 24 opens. Because the short tube 108 opens near the inlet port 28, the enriched mixture, as in the other embodiments, is supplied substantially only into the flow P which enters auxiliary chamber 26. Consequently, the flow P has a lowered air-to-fuel ratio, and is therefore more readily ignitable than the air/fuel mixture supplied through the passage 98.

As is evident from the above, the invention, as embodied herein and depicted in FIGS. 15 and 16, promotes atomization of the rich air/fuel mixture since it is preheated by the heat of the cylinder head, thereby ensuring its ignition to a greater extent than conventionally. The short tube 108 can be located accurately, and is less liable to be deformed under the influence of heat and other factors. The tube 108 is also advantageous in respect of servicing, inspection and maintenance because it may be freely fitted and detached by means of its threaded portion 110, or its press-fitting.

Figure 17:
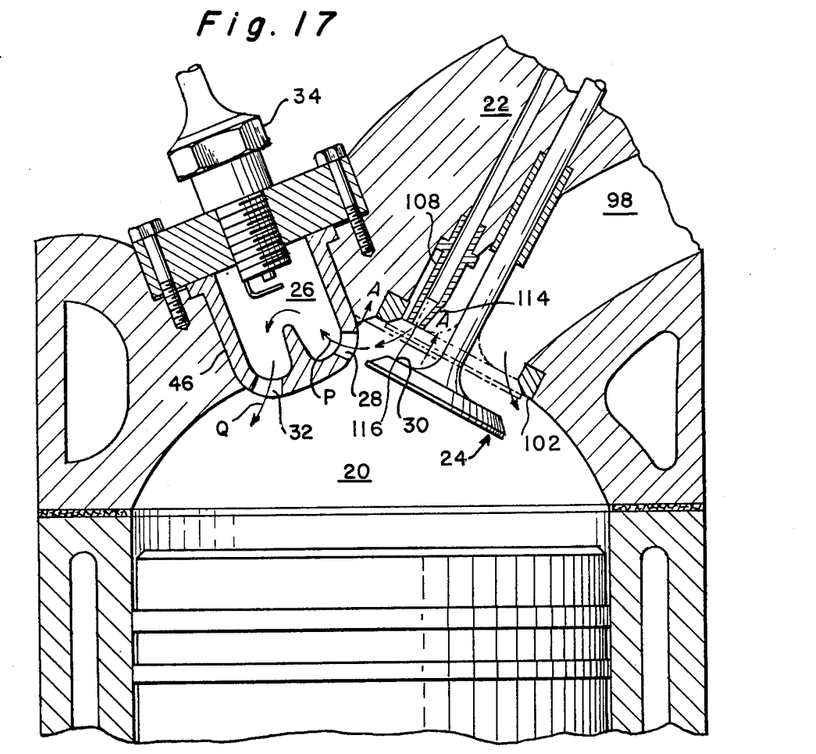
FIG. 17 is another embodiment of the enriched air/fuel input of FIG. 15.
Figure 18:
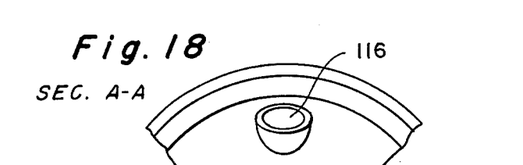
FIG. 18 is an enlarged front view taken along line A—A of FIG. 17.

In accordance with the invention, the short tube 108 may have its outlet end flattened into an elliptical shape for directing the richer mixture more effectively and smoothly into the inlet port 28 of the auxiliary combustion chamber 26.

As shown in FIGS. 17 and 18, at least one side of the tube 108 may have a portion 114 flattened inwardly to form an elliptical outlet 116. The flow of the rich air/fuel mixture along the back surface 30 of the intake valve 24 and the wall of the main combustion chamber 20 is thus directed accurately into the inlet port 28.

Figure 19:
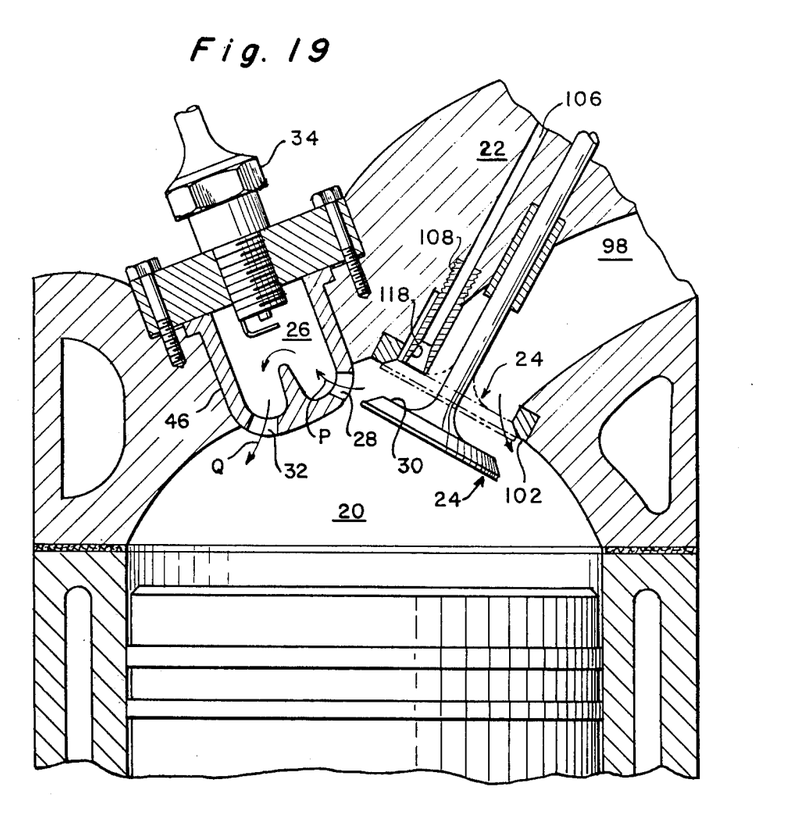
FIG. 19 is still another embodiment of the enriched air/fuel input of FIG. 15.

Also in accordance with the invention, the short tube 108 may be fabricated of a soft metal, such as copper, and the walls of the tube thinned near the outlet end of the tube for automatically adapting the outlet tube to the recession of the outlet valve, as the valve 24 and the valve seat 102 tend to wear in use.

The intake valve 24 normally rests on the valve seat 102, but the valve and seat sometimes wear, recessing the valve a little more deeply when it has been used for a long time or during the running-in period. If then the rich air/fuel mixture supply tube 108 is made of some material with high rigidity, it may impair the operation of the intake valve or prevent it from being perfectly closed. To avoid such problems, the tube 108 in this invention preferably reduced in wall thickness at its outlet end portion 118, and is preferably made of a relatively soft material such as copper or the like. In this embodiment of the invention, that portion 118 of the outlet end of the rich air/fuel mixture supply tube 108, which contacts the intake valve 24, becomes deformed to adapt itself to the pressure thereof should the intake valve recede to a greater extent than is expected either during the initial running-in period or over the longer period of time the car is operated.

As is evident from the above, this embodiment maintains the seal between the intake valve 24 and its valve seat 102 for a long duration by absorbing the effect of the recession of the intake valve. In addition, this embodiment prevents the deformation of the rich air/fuel mixture supply tube, except at the thinned edge of the tube.

In accordance with the invention, the passage through the cylinder head for introducing the rich air/fuel mixture into the auxiliary combustion chamber may open into an annular groove formed in the wall of the lean air/fuel mixture intake and a sleeve defining a passage portion for the rich mixture may be fixed in the outlet of the intake. It is advantageous for the apparatus admitting the rich air/fuel mixture to be able to be assembled with a minimum of complexity and with a maximum of flexibility as to various types of combustion chambers and lean air/fuel intakes. It is also desirable to minimize resistance to the lean air/fuel mixture being drawn into the main combustion chamber through the intake valve.

Figure 20:
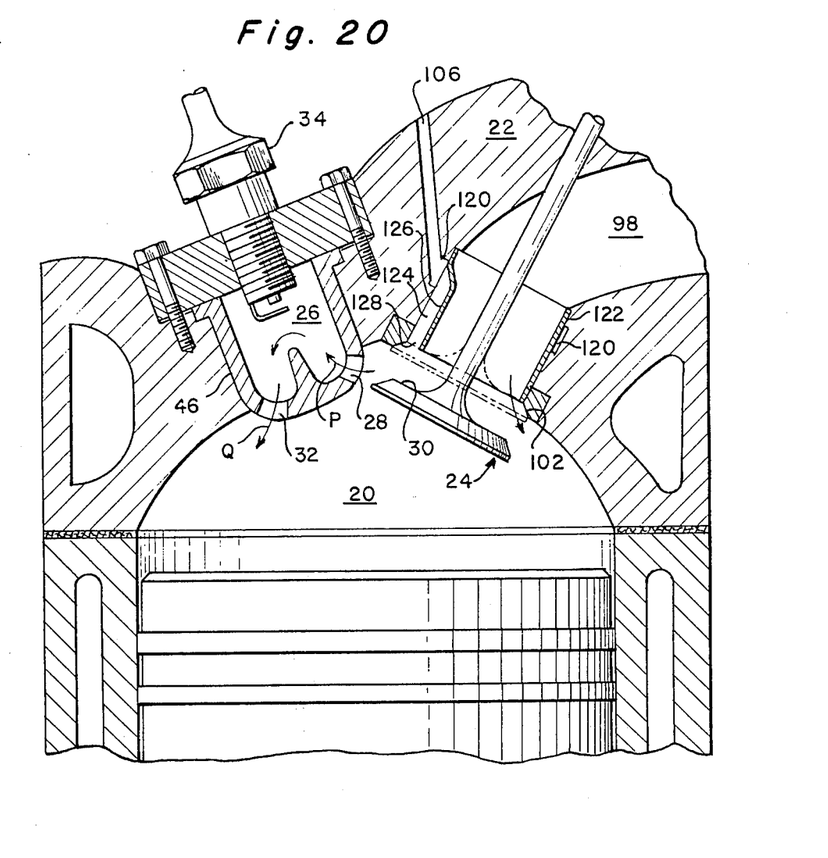
FIG. 20 is a cross-sectional view of the auxiliary combustion chamber and a different embodiment of the air/fuel input of the invention.
Figure 21:
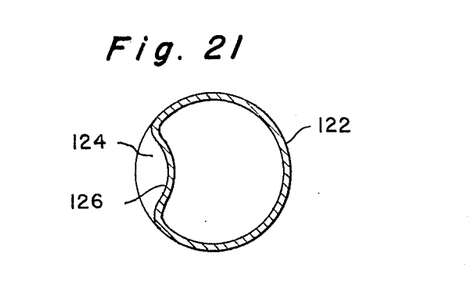
FIG. 21 is an enlarged partial view taken along the line A—A of FIG. 20.

As embodied herein and illustrated in FIGS. 20 and 21, the bore 106 in the cylinder head 22, which form a passageway for the rich mixture, opens into an annular groove 120 formed in the internal wall surface of the lean mixture intake 98. A sleeve 122 is fitted in the intake 98 for defining a passage 124 between an indented portion 126 formed on the periphery of the sleeve and the wall of the intake passage 98. The passage portion 124 communicates with the bore 106 through the annular groove 120. Further, end 128 of the passage 124 is positioned adjacent the inlet port 28 in the auxiliary combustion chamber 26. Preferably, the end 128 is so disposed as to be closed by the back face 30 of the intake valve 24 when the valve is in closed position. In such case, to prevent the valve 24 from being held away from the valve seat 102 by the sleeve 122 when the valve and seat wear and the valve becomes recessed, the sleeve may be made of soft material such as thin copper metal sheet.

In this embodiment of the invention, a stream of incoming mixture (indicated by the arrow P in the drawing) is introduced into the auxiliary combustion chamber 26 through the inlet port 28 as the intake valve 24 opens on the suction stroke. Then the residual combustion gas produced by the preceding combustion stroke, remaining in the auxiliary combustion chamber 26, is scavenged into the main combustion chamber 20 through the outlet port 32, as indicated by the arrow Q. As the intake valve 24 opens the end 128 of the passage portion 124 is uncovered and the rich air/fuel mixture is drawn through the supply passage 106 and passage 124 and becomes part of the flow P entering the auxiliary combustion chamber 26 to ensure subsequent ignition of the mixture following compression.

As embodied herein, the sleeve 122 is provided over the annular groove 120 to supply the rich air/fuel mixture. Therefore, it offers much flexibility in respect to the fitting of the sleeve and the construction of the rich air/fuel mixture supply passage 106. Furthermore, the apparatus, according to this invention, can be fitted efficiently and applied to various types of combustion chambers. Also, it is excellent in respect of performance and manufacture. In addition, a reduction in suction efficiency is prevented, because there is less resistance to the stream of incoming lean mixture within the intake passage 98. Further, this embodiment permits the maintaining of a tight seal between the intake valve 24 and its valve seat 102 for a long time by accommodating the recession of the intake valve seat by a slight deformation of the sleeve 122.

It will be apparent to those skilled in the art that various modifications and variations could be made in the present invention without departing from the scope or spirit thereof.

What is claimed is:

1. Combustion apparatus for an internal combustion engine comprising:
    a main combustion chamber, including a cylinder head;
    an auxiliary combustion chamber including a cavity in said cylinder head having an opening into said main combustion chamber;
    an aperture in said cylinder head interconnecting with said cavity;
    an auxiliary combustion chamber shell fitted into said cavity from the main combustion chamber through said opening, said shell including a threaded aperture; and
    a spark plug inserted through said aperture in said cylinder head and threaded into said aperture in said shell, said spark plug threadedly retaining said shell in said cavity.

2. The combustion apparatus of claim 1 also including means for preventing the rotation of said shell in said cavity.

3. The combustion apparatus of claim 2 wherein said rotation preventing means includes a recess in the outer surface of said shell and a pin threaded through said cylinder head, the inner end of said pin engaging said recess.

4. The combustion apparatus of claim 3 wherein the base and side wall portions of said shell are formed as a right circular cylinder, said spark plug being axially aligned in the base of said cylinder and said recess being located in the curved surface of said cylinder.

5. The combustion apparatus of claim 2 also including an intake valve in said main combustion chamber, and wherein said shell includes an inlet port and an outlet port both opening into said combustion chamber, said inlet port being directed toward said intake valve and wherein said means for preventing the rotation of said shell in said cavity also identifies the proper position of said shell in said cavity.

6. The combustion apparatus of claim 5 wherein said means for preventing the rotation of said shell and for properly positioning said shell in said cavity includes a recess in the outer surface of said shell and a pin threaded through said cylinder head, the inner end of said pin engaging said recess.

7. Combustion apparatus for an internal combustion engine including a combustion chamber and a spark plug fitted in a cylinder head for firing an air/fuel mixture compressed in said combustion chamber comprising:
    a cavity in said cylinder head,
    an auxiliary combustion chamber shell fitted in said cavity, the base and side wall portions of said shell being formed as a right circular cylinder, said shell including a threaded aperture axially aligned in the base thereof and a threaded aperture through the curved surface of the cylindrical portion thereof,
    apertures in said cylinder head for alignment with said apertures in said shell, said spark plug being inserted through aligned apertures into the curved surface of the cylindrical portion of the shell, and
    a bolt inserted through aligned apertures and threaded into the axially aligned aperture in the base of said shell.

8. The combustion apparatus of claim 7 wherein the threaded aperture through the curved surface of the cylindrical portion of the shell and the aligned aperture through the cylinder head are angled away from said base.

9. Apparatus for assembling combustion apparatus in an internal combustion engine including a combustion chamber, a spark plug fitted into a cylinder head for firing an air/fuel mixture compressed in the combustion chamber, and an auxiliary combustion chamber in the cylinder head including a cavity in the cylinder head and an auxiliary combustion chamber shell to be fitted in the cavity, the shell having its base and wall portions formed as a right circular cylinder, comprising:
    an aperture in said cylinder head and a threaded aperture in said shell, said apertures to be aligned for receiving said spark plug; and
    a positioning tool to be inserted through said apertures for properly aligning said apertures.

10. The assembling apparatus of claim 9 wherein said positioning tool is threaded at the inserted end for engaging the threaded aperture.

11. The assembling apparatus of claim 9 wherein said threaded aperture is in the curved cylindrical wall of said shell and wherein said assembling apparatus also includes a threaded aperture axially aligned in base of the cylindrical portion of said shell, an aperture in said cylinder head aligned with said axial aperture and a bolt for inserting through said cylinder head and threading into said axial aperture.

12. The combustion apparatus of claim 5 also including means for supplying a rich air/fuel mixture to said main combustion chamber and said auxiliary combustion chamber, said rich air/fuel supplying means being controlled by said intake valve.

* * * * *